(12) United States Patent
Skidmore et al.

(10) Patent No.: US 10,726,614 B2
(45) Date of Patent: Jul. 28, 2020

(54) METHODS AND SYSTEMS FOR CHANGING VIRTUAL MODELS WITH ELEVATION INFORMATION FROM REAL WORLD IMAGE PROCESSING

(71) Applicant: EDX Technologies, Inc., Austin, TX (US)

(72) Inventors: Roger Ray Skidmore, Austin, TX (US); Eric Reifsnider, Raleigh, NC (US)

(73) Assignee: EDX TECHNOLOGIES, INC., Austin, TX (US)

( * ) Notice: Subject to any disclaimer, the term of this patent is extended or adjusted under 35 U.S.C. 154(b) by 0 days.

(21) Appl. No.: 15/992,892

(22) Filed: May 30, 2018

(65) Prior Publication Data

US 2018/0350137 A1 Dec. 6, 2018

Related U.S. Application Data

(60) Provisional application No. 62/512,269, filed on May 30, 2017.

(51) Int. Cl.
| | | |
|---|---|---|
| *G06T 17/05* | (2011.01) | |
| *G06T 19/00* | (2011.01) | |
| *G06T 17/00* | (2006.01) | |
| *G06T 7/00* | (2017.01) | |
| *G06F 3/01* | (2006.01) | |
| *G06F 3/0481* | (2013.01) | |
| *G06T 5/50* | (2006.01) | |
| *G06T 7/55* | (2017.01) | |

(52) U.S. Cl.
CPC ............. *G06T 17/05* (2013.01); *G06F 3/011* (2013.01); *G06F 3/04815* (2013.01); *G06T 5/50* (2013.01); *G06T 7/00* (2013.01); *G06T 7/55* (2017.01); *G06T 17/00* (2013.01); *G06T 19/006* (2013.01); *G06T 2207/20076* (2013.01)

(58) Field of Classification Search
CPC ......... G06T 17/05; G06T 19/006; G06T 7/00; G06T 5/50; G06T 7/55; G06T 17/00; G06T 2207/20076; G06T 19/00; G06T 2207/10028; G06T 2207/10016; G06T 2207/30256; G06T 7/74; G06T 7/70; G06F 3/011; G06F 3/04815
See application file for complete search history.

(56) References Cited

U.S. PATENT DOCUMENTS

| | | | |
|---|---|---|---|
| 9,305,219 B2* | 4/2016 | Ramalingam | G06K 9/00791 |
| 2012/0206452 A1* | 8/2012 | Geisner | G02B 27/017 |
| | | | 345/419 |
| 2018/0061129 A1* | 3/2018 | Sisbot | G06T 19/006 |
| 2018/0089899 A1* | 3/2018 | Piemonte | G01C 21/365 |

* cited by examiner

*Primary Examiner* — Xilin Guo
(74) *Attorney, Agent, or Firm* — W&C IP

(57) ABSTRACT

Methods and devices are disclosed which provide modification, editing, or extension of augmented reality and virtual reality representations of real world spaces using elevation information obtained from image processing of real world images.

20 Claims, 3 Drawing Sheets

METHODS AND SYSTEMS FOR CHANGING VIRTUAL MODELS WITH ELEVATION INFORMATION FROM REAL WORLD IMAGE PROCESSING

CROSS-REFERENCE TO RELATED APPLICATIONS

This application claims the benefit of U.S. Provisional Patent Application No. 62/512,269, filed May 30, 2017, the complete contents of which are herein incorporated by reference.

FIELD OF THE INVENTION

The invention generally relates to methods and systems for virtual models of real world spaces and, in particular, methods and systems which accurately determine or provide elevation information for the real world spaces that they model.

BACKGROUND

An example of a virtual world is a digital terrain model (DTM). A DTM comprises a digital raster grid that divides a land surface of constant elevation into a plurality of grid cells with each cell holding a separate elevation value. DTM have a variety of applications including, for example, radio propagation studies conducted by telecommunications companies to assess where wireless signals reach and where they are blocked or reflected.

Many virtual worlds/models employ clutter data which is stored in a database (a "clutter database"). For each point or coordinate of the virtual terrain, there is a code to a look-up table which indicates that at the given point or coordinate there is a particular type of object, such a tree/forest, parking lot, river, or building. Elevation data may be absent from clutter data or absent from the virtual models which are presented to users with a VR or AR output device using the clutter data. In some cases it may be that clutter data oversimplifies the characterization of elevations. For instance, terrain coordinates labeled with "dense forest" may be given a uniform 60 feet elevation value despite the fact some parts of the forest are higher in elevation and some parts are lower in elevation. As another example, a user would see in the VR or AR output an indication that a building exists at some location, but the building would be entirely flat and conforming with the terrain. In other words, the representation would be essentially two-dimensional (2D) and the building would have no elevation or height representation whatsoever. Sometimes a provider of the virtual model has access to elevation data but denies access to users. In some cases, a fee system is used to limit access to elevation information for a virtual model. If a user has need of elevations for only a small part of the model, the user may be forced to pay for elevation data for the entire model or a larger part of the model than is needed.

An existing solution by which virtual world providers (e.g., Google® which offers Google Earth®) determine elevation dimensions for objects such as buildings or forests is to use satellite images, aerial images captured from aircraft, or a combination of the two. Stereo imagery is the practice by which images of the same object taken from two different camera locations are used to determine elevation. A difference in apparent location of the object will appear between the two images. This is called parallax. The measured parallax together with the known camera locations are used together to determine a true elevation of the object. A problem with the aerial approach is that it is expensive and inconvenient. Satellites and planes are very expensive to obtain, operate, and maintain, yet they are essential to existing stereo imagery methods for determining elevations. The need exists for new cost effective solutions for determining elevations for virtual models of real world spaces.

SUMMARY

According to some exemplary embodiments, image processing of the real world is used to modify 3D virtual models that have been modeled after the real world.

An advantage of some embodiments is the elimination of a need to generate new data for an entire geographic area in order to update elevation data. A specific and relatively confined area can be updated on demand while a remainder of surrounding area is left as-is in the virtual model.

Another advantage of some embodiments is the ability to generate and update elevation data without requiring the involvement of airplanes or satellites.

According to another aspect, some embodiments have user interactive elements.

DETAILED DESCRIPTION

Figure 1:
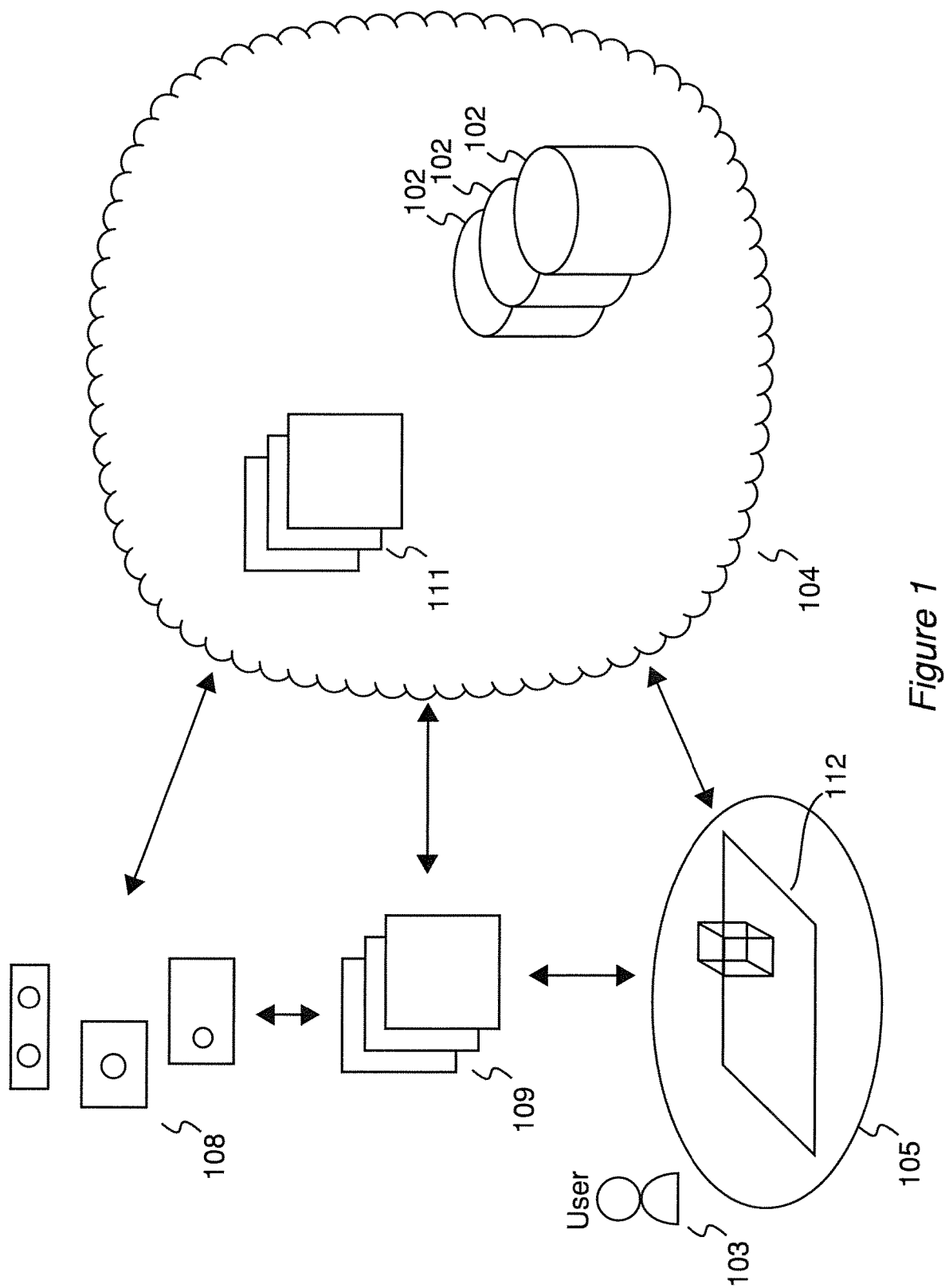
FIG. 1 is an exemplary system for providing a virtual reality (VR) or augmented reality (AR).

A real world image may be captured with a camera or cameras close to the ground. For instance, a real world image captured by the camera may be taken from the viewpoint of a human user as if the user were situated in the space (e.g., sitting, standing, walking, driving, biking, etc.). Images may also be captured from consumer drones. From the captured image or video, elevation (e.g., height) information for terrain or objects within the image may be obtained. For instance, a user may be standing a couple blocks from the Empire State Building and take photographs or video of the building from at least two different vantage points. From these images or video, an estimation of the building's elevation may be determined. The real world space which the image describes is also described by a virtual model. In the Empire State example, a virtual three-dimensional model of New York City may be provided in which a virtual Empire State Building exists (i.e., as a virtual object assigned height and other size and appearance characteristics to resemble the real Empire State Building, and further assigned location information within the virtual model and with respect to other virtual objects to provide a relatively accurate recreation of the real NYC within the virtual world). The virtual objects which correspond with real world objects in the image have initial elevation information stored in pre-existing virtual model data which is useable for creating virtual reality and augmented reality representations. However, this elevation information may be inaccurate, out-dated, or otherwise inconsistent with the real world elevation. Methods, devices, and systems are disclosed which permit information in the virtual model to be checked for accuracy using real world images or videos that describes the same real world geographic space which is represented in the virtual model.

According to one aspect of some embodiments, a first value for the elevation of a particular object is determined based on a real world image, and a second value for the elevation of the particular object is determined from the virtual model (e.g., this determination may be made by accessing a database where the height information is stored). The first and second values are compared to give a delta. If the first and second values are exactly identical, the delta's value may simply be zero. Otherwise, however, the delta takes some non-zero value which describes the discrepancy between the elevation of the object in the virtual world and the elevation of that same object in the real world as perceived using the captured image.

Deltas describe a spatial error between a real world geographic space and the virtual model that has been configured to reproduce that real world geographic space in a virtual world. An objective of some embodiments of the present invention is to minimize or eliminate such spatial errors. Even where initial elevation information is accurate in a virtual model, changing landscapes and cityscapes mean that elevation at a given geographic coordinate changes with time and may not remain accurate despite being accurate at such time in the past that an elevation value was last assigned in the virtual model.

Embodiments of the invention make possible the modification, extension, editing, or alteration to the data underlying a virtual model of a real world space based on image processing of the real world. The modification or extension to the underlying data may be made en masse.

Exemplary methods permit the updating and alteration of something as small as a single virtual object, leaving a remainder of the virtual model unchanged if so desired. This contrasts with prior methods such as updating a whole geographic space, e.g. a whole city block or a whole city, based on an aerial or satellite flyover.

The capability of updating information for specific individual objects allows for pinpointed updates. As an illustration, a telecom company may be aware of the construction of a new building at a particular set of coordinates. The construction will be ongoing for a year, and the elevation of the building will change over the course of that year as additional levels are successively added. The telecom company has a need of knowing how the building may affect wireless signal transmissions and strength in the area surrounding the building, but their virtual model used when making this assessment must have accurate elevation data to provide an accurate and up-to-date characterization of the wireless environment. An individual at the construction site may be instructed by an embodiment to take a short (e.g., 5 second) video with, for example, a handheld cellphone. This video capture step may be repeated cyclically, such as every day or every week during the construction. Alternatively, multiple traffic cams at street corners facing the construction site may have views of the construction site. According to a method of the invention, the captured videos/images of the person's mobile device or the traffic cams can be processed at minimal cost to provide an estimate of the height of the building on any given day or week. Each time new video or image data is obtained it may be processed to provide a new height/elevation value. This can be used to generate a new delta, and the virtual model can be updated using the delta. The cost of obtaining and processing the mobile device video or the traffic cam image feeds is negligible in comparison to the alternative of using flyover from planes or satellites to take new height information for the entire area in which the new building is being constructed.

As the example in the preceding paragraph illustrates, an exemplary method allows a user to pinpoint a specific location where a problem exists (e.g., changes have occurred or are occurring to the height of a structure or structures there) and eliminate that informational problem in the virtual model without the need and expense of performing an entirely new survey of the entire area. In some scenarios elevation information in the real world may change and yet users have no need of updating the whole model but do need an update for one specific structure among many others. The method allows for updating just that specific structure's elevation using a delta and leaving the remainder of the model unchanged, since it is either unneeded or undesired.

According to some exemplary methods and devices, human users may be provided real time notifications or updates to the virtual model, even while it is in use. As an illustrative example, a human user may be wearing or carrying a VR or AR device on a city street and turn the camera or cameras of the device to a city block where a building was recently demolished. The device (or a remote device with which it is networked) computes a value for the elevation of the building or what is left of the building based on the real world image captured by the VR or AR device's camera. This value is compared against a stored elevation value for the building that is used in a virtual model that supplies the augmentations for AR and/or the virtual objects for the VR. The result is a delta. The delta may then be compared with thresholds and/or conditions which, based on the delta's value, provide different outputs to the user. In this example, the relatively high delta value which corresponds with the change in elevation from pre-demolition to post-demolition of the building exceeds a threshold test and triggers a notification to the user that the building has been destroyed. The test may trigger a variety of effects. For instance, it may trigger a look up of a schedule of construction activities for the company or for the city. The look up process may find the date on which the building was torn down and supply this information to the user. The information may be displayed with a display or output through a speaker as an augmentation to the user's AR experience or an element within her VR experience. The augmentations or virtual outputs may be interactive and change or differ based on user preferences, input, selections, or the like.

FIG. 1 provides a summary schematic of hardware which may be connected (e.g., networked together) to provide exemplary embodiments described herein. One or more databases 102 store pre-existing virtual model data useable to generate VR or AR representations. In many instances, the pre-existing virtual model data may include or consist of model data generated using an aerial or satellite method described above. The model data stored on databases 102 may be proprietary (e.g., owned by Google® or Microsoft®.) The databases 102 may be arranged at one or more remote locations from an end user 103 but accessed via a network 104 such as the Internet. The user 103 accesses remote databases on the network by way of a device 105 which is configured for providing output to a user and receiving input from the user.

Consequential to many exemplary embodiments is the role of one or more cameras 108 which are for capturing images or video of a real world space corresponding with a virtual world space described by the pre-existing virtual model data stored on databases 102. The cameras may be separate from or, alternatively, integral with device 105. Cameras 108 may be, for example, a mobile phone camera, tablet camera, wearable camera, special purpose camera, traffic camera, and/or some other type of camera. One or more processors 109 and/or 111 are configured to execute computer-implemented instructions which, which when executed by the processors, cause the processors to perform a series of steps. The processors 109/111 receive as an input images or video from the camera(s) 108. The processors perform image processing of the images or video to determine an elevation value for an object in the images or videos. The processors access the databases 102 to collect or receive object elevation values. The processors compare the elevation value determined from the image processing with a corresponding elevation value in the virtual model data to determine a delta. The processors then initiate a signal for controlling a virtual reality or augmented reality output by an output device using the delta. For instance, the initiated signal may change the virtual reality representation 112 presented by device 105 to user 103. As represented in the schematic of FIG. 1, the processors 109 and 111 may be in different physical locations but in communication over a network. The processor(s) 109 may be integral with the device 105.

Figure 2:
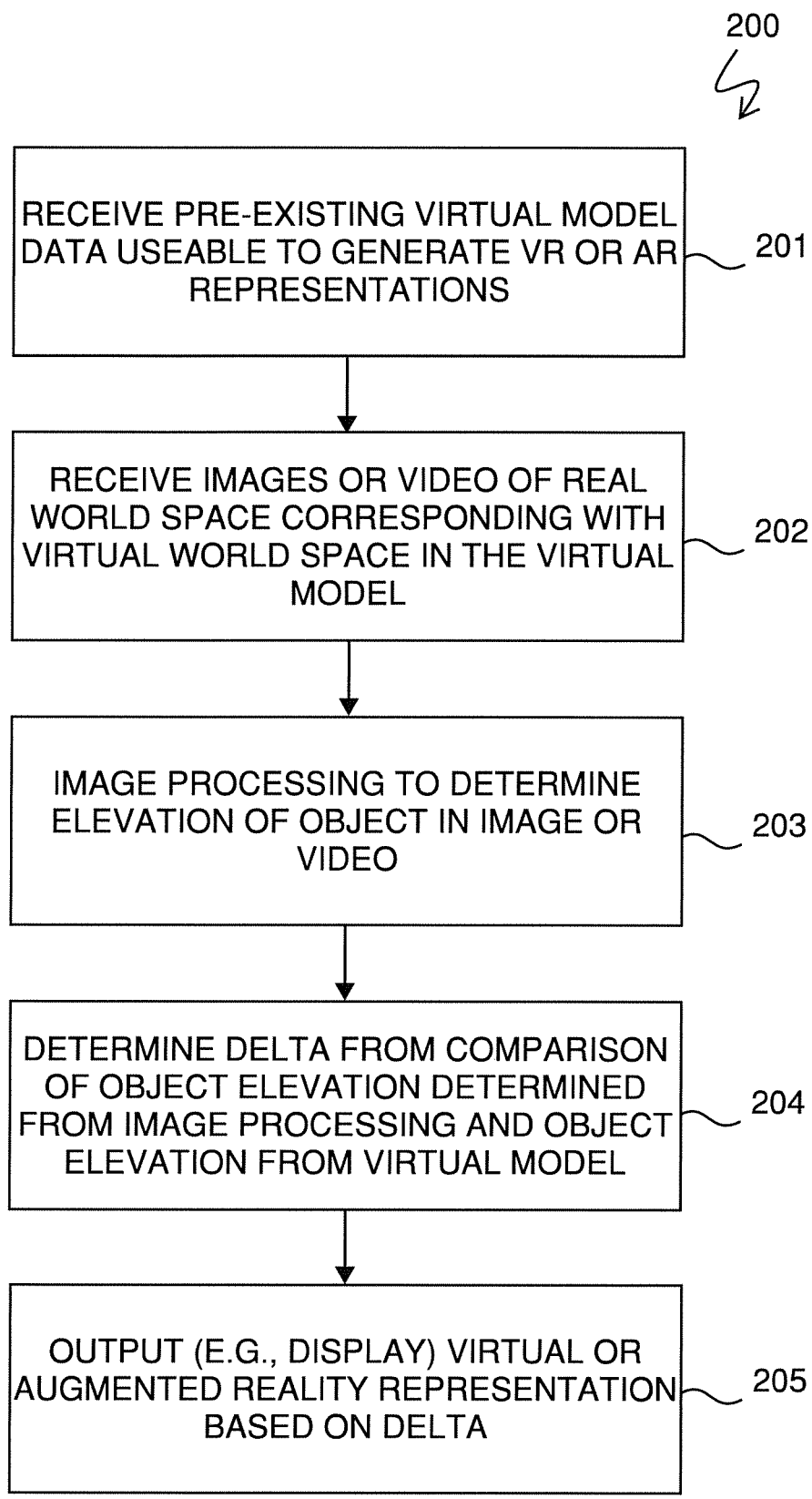
FIG. 2 is a process for providing a VR or AR.

FIG. 2 shows a process 200 for providing a virtual reality (VR) or augmented reality (AR). The process 200 may be implemented with, for example, the system illustrated in FIG. 1. At step 201, pre-existing virtual model data useable to generate VR or AR representations is received. At step 202, images or video of a real world space corresponding with the virtual world space in the virtual model are received. At step 203, image processing is performed on the received images to determine an elevation of an object (e.g., a building, structure, natural landform, artificial landform, etc.) in the received images or videos. At step 204, a delta is determined by the comparison of object elevation determined from the image processing at step 203 and the object elevation as given by the virtual model data received at step 201. At step 205, the output of an AR or VR device is in generated in dependence of the delta determined at block 204. For example, a new or modified virtual object representation might be shorter or taller than it otherwise would be based on the pre-existing virtual model data alone.

Image processing (e.g., block 203 of FIG. 2) to obtain height information of a real world object may be performed according to one or more of various image processing algorithms, including existing algorithms known in the art and algorithms yet to be developed which fulfill the desired purpose. In some embodiments, the image processing may use just a single image as input. However, elevation determining algorithms which use multiple images (or video frames) are more accurate and therefore generally preferred.

Figure 3:
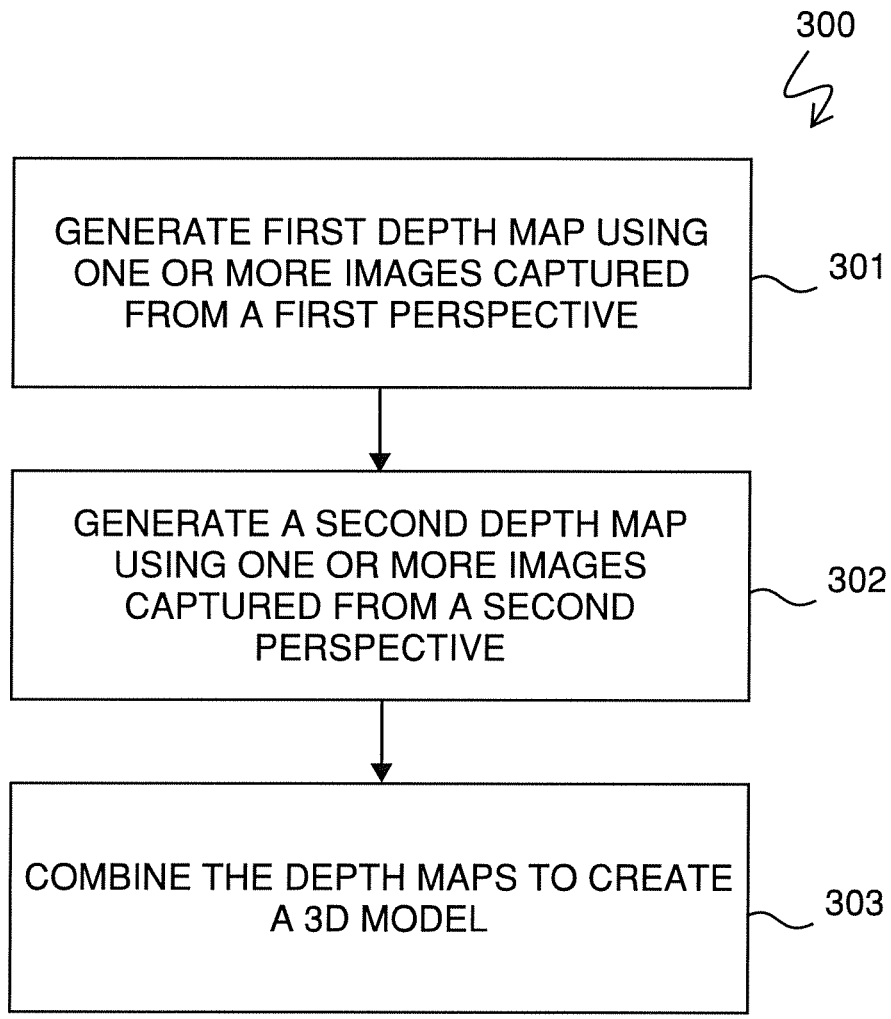
FIG. 3 shows a process for image processing to determine an elevation value for an object from multiple images.

FIG. 3 shows an exemplary process 300 for image processing to determine an elevation value for an object as imaged by one or more cameras. Process 300 processes images (e.g., still images or video frames) taken from at least two different perspectives (vantages) and uses the images to create depth maps. A depth map indicates how far away each pixel is from the viewpoint, whether the viewpoint corresponds with a single image or with multiple images after a merging operation. A depth map allows a user to know approximately how far away any given surface is that is visible in an image. A depth map does not, however, give any description of surfaces which are not visible in the image. At block 301, a first depth map is generated using one or more images captured from a first perspective. At block 302, a second depth map is generated using one or more images captured from a second perspective. The locations of the two perspectives may be far apart or only slightly apart. For instance, in some cases the inability of a human user to stand perfectly still while holding a camera may yield sufficient change in camera perspective to result in two sufficiently different perspectives/vantages for use in process 300. Additional depth maps from additional perspectives may be employed in some embodiments. The multiple depth maps are combined (e.g., merged) at block 303 to create a 3D model describing objects and space in the one or more images. In order to combine the depth maps, the images taken from different perspectives necessarily include some of the same objects or spaces.

Creating a 3D model (e.g., a mesh model) is one approach to image processing which is employable to determine an elevation value of a real world object. According to some methods, a 3D structure is produced from multiple images in different viewpoints using a combination of three algorithms: the SIFT algorithm, the SFM algorithm, and the MVS algorithm. First, the SIFT algorithm determines a set of corresponding features in a pair of images. The SIFT algorithm is one feature matching algorithm, and those of skill in the art will recognize that other feature matching algorithms may also be used in addition to or in place of the SIFT algorithm. The corresponding features that result from the SIFT algorithm are sometimes referred to as "SIFT features."

After execution of the feature matching algorithm like SIFT, a Structure-From-Motion (SFM) algorithm, is executed to estimate camera parameters for each image. The camera parameters generally include extrinsic parameters that provide an indication of the camera position (including both a 3-D camera location and a pointing direction) and intrinsic parameters related to the image magnification.

After execution of the SFM algorithm, a Multi-View-Stereo (MVS) algorithm is used to combine the images, the corresponding features, and the camera parameters to generate a dense 3-D point cloud. MVS algorithms are particularly well suited for relatively small datasets.

Image processing may consist of or comprise generating a single image depth map by first dividing up a single image into homogenous patches, and then applying a trained Markov Random Field to each patch to assign the patch a depth and orientation. The Markov Random Field is trained for this purpose via supervised learning on a dataset of sample patches. The resulting set of patches of the image processing describes the depth map for the entire image, as segmented into the patches. Alternative single image processing methods may also be employed.

Another example of a real time update to the output of an AR or VR device is the scenario of a new building having been constructed since a virtual model of the city was created. A street level camera captures an image or video feed which includes the new building. A delta is calculated. Even as the user may be looking at the virtual model which at first shows a ground level surface, the building may suddenly "pop up" with an elevation change in the virtual model based on the value of the delta.

Some exemplary methods and devices are configured for indoor use. As one illustrative indoor use, a two-dimensional (2D) blueprint can be supplemented with elevation information to give a three-dimensional (3D) model. As a camera is moved around the building, it captures an image or video feed. The images or video are processed to determine elevation information for different rooms and objects in the rooms (e.g., cubicle wall height). The determined elevation information can then be used to show a virtual object or augmentation with the determined elevation (e.g., show a virtual cubicle wall with a height that corresponds with the real world cubical wall height).

A user may be presented with an augmented reality view of a delta (e.g., block 205 of FIG. 2) in various ways. As an example, for a new or extended obstacle discovered via incoming imagery, the system (e.g., that of FIG. 1) could show an augmentation that represents the additional construction as a partly transparent highlight over the portion of a building that was new and not in the database, so that the user could clearly see the new obstacle marked in a live video stream. Or, if the delta is negative (e.g., a building was torn down), the system may augment the live video stream with a 3D virtual building extension (or other virtual object), positioned and sized to fill in the now-empty space occupied by the measured delta.

Databases of embodiments of the invention may be or comprise computer readable storage media that are tangible devices that can retain and store instructions for use by an instruction execution device like processors described herein. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or schematic diagrams of methods, apparatus (systems), and computer program products according to embodiments of the invention. It will be understood that each block of the flowchart illustrations and/or block diagrams, and different combinations of blocks in the flowchart illustrations and/or block diagrams, may be implemented by or with the use of computer readable program instructions and by or with one or a plurality of processors and supporting hardware, software, and firmware.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. This may have the effect of making a general purpose computer a special purpose computer or machine. A "processor" as frequently used in this disclosure may refer in various embodiments to one or more general purpose computers, special purpose computers, or some combination thereof. Computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

An "output device", as used herein, is a device capable of providing at least visual, audio, audiovisual, or tactile output to a user such that the user can perceive the output using his senses (e.g., using her eyes and/or ears). In many embodiments, an output device comprises at least one display, at least one speaker, or some combination of display(s) and speaker(s). The output device may also include one or more haptic devices. A suitable display (i.e., display device) is a screen of an output device such as a mobile electronic device (e.g., phone, smartphone, GPS device, laptop, tablet, smartwatch, etc.). Another suitable output device is a head-mounted display (HMD). In some embodiments, the display device is a see-through HMD. In such cases the display device passively permits viewing of the real world without reproducing details of a captured real world image feed on a screen. In a see-through HMD, it is generally only the augmentations that are actively shown or output by the device. Visual augmentations are in any case superimposed on the direct view of the real world environment, without necessarily involving the display of any of the original video input to the system. Output devices and viewing devices may include or be accompanied by input devices (e.g., buttons, touchscreens, menus, keyboards, data ports, etc.) for receiving user inputs. Some devices may be configured for both input and output (I/O).

While the invention has been described herein in connection with exemplary embodiments and features, one skilled in the art will recognize that the invention is not limited by the disclosure and that various changes and modifications may be made without departing from the scope of the invention as defined by the appended claims.

What is claimed is:

1. A method of providing a virtual reality (VR) or augmented reality (AR) based on a pre-existing virtual model that is at risk of containing inaccurate, out-dated, or otherwise inconsistent data for describing a real world space, comprising receiving, with one or more processors, pre-existing virtual model data from one or more databases, the pre-existing virtual model data useable to generate VR or AR representations;

receiving, with the one or more processors, one or more images or video of a real world space corresponding with a virtual world space described by the pre-existing virtual model data;

performing image processing of the one or more images or video to determine an elevation value for one or more objects in the image or video;

comparing each elevation value determined from the image processing with a corresponding elevation value in the virtual model data to determine one or more deltas for the one or more objects; and initiating a signal for controlling a virtual reality or augmented reality output by an output device using the one or more deltas, wherein each delta describes a discrepancy between a specific individual object's elevation in the virtual world versus in the real world as perceived using the captured one or more images or video.

2. The method of claim 1, wherein the step of performing image processing comprises generating a first depth map using one or more images captured from a first perspective, generating a second depth map using one or more images captured from a second perspective different from the first perspective, and combining the first and second depth maps to create a 3D model describing objects or spaces in the one or more images visible from both the first and second perspectives.

3. The method of claim 1, wherein the step of performing image processing comprises generating a single image depth map by dividing up a single image into homogenous patches, and applying a trained Markov Random Field to each patch to assign the patch a depth and orientation.

4. The method of claim 1, further comprising updating information for specific individual objects as pinpointed updates that leave a remainder of the virtual model unchanged.

5. The method of claim 1, wherein the pre-existing virtual model includes or consists of model data generated using either aerial or satellite data collection.

6. The method of claim 1, wherein the one or more objects include at least one of a building, structure, natural landform, or artificial landform.

7. The method of claim 6, wherein at least one of the one or more objects is a building.

8. The method of claim 7, wherein a delta for the building reflects changes in building elevation resulting from demolition or construction.

9. The method of claim 1, wherein each time a new video or image data is obtained it is processed to provide a new height/elevation value.

10. The method of claim 1, further comprising capturing the one or more images or video of a real world space with multiple traffic cams.

11. The method of claim 1, wherein the image processing comprises a combination of a scale invariant feature transform (SIFT) algorithm, a Structure-From-Motion (SFM) algorithm, and a Multi-View-Stereo (MVS) algorithm.

12. A system for providing a virtual reality (VR) or augmented reality (AR), comprising one or more databases storing pre-existing virtual model data useable to generate VR or AR representations;

one or more cameras for capturing an image or video of a real world space corresponding with a virtual world space described by the pre-existing virtual model data;

one or more processors configured to execute computer-implemented instructions which, when executed by the processors, cause the processors to perform image processing of the image or video to determine an elevation value for one or more objects in the image or video, compare each elevation value determined from the image processing with a corresponding elevation value in the virtual model data to determine one or more deltas for the one or more objects; and initiate a signal for controlling a virtual reality or augmented reality output by an output device using the one or more deltas, wherein each delta describes a discrepancy between a specific individual object's elevation in the virtual world versus in the real world as perceived using the captured one or more images or video.

13. The system of claim 12, further comprising one or more output devices for displaying the object in a VR or AR representation using the delta.

14. The system of claim 12, wherein the step of performing image processing comprises generating a first depth map using one or more images captured from a first perspective, generating a second depth map using one or more images captured from a second perspective different from the first perspective, and combining the first and second depth maps to create a 3D model describing objects or spaces in the one or more images visible from both the first and second perspectives.

15. The system of claim 12, wherein the step of performing image processing comprises generating a single image depth map by dividing up a single image into homogenous patches, and applying a trained Markov Random Field to each patch to assign the patch a depth and orientation.

16. The system of claim 12, comprising further computer-implemented instructions which, when executed by the processors, cause the processors to update information for specific individual objects as pinpointed updates that leave a remainder of the virtual model unchanged.

17. The system of claim 12, wherein the pre-existing virtual model includes or consists of model data generated using either aerial or satellite data collection.

18. The system of claim 12, wherein the one or more objects include at least one of a building, structure, natural landform, or artificial landform.

19. The system of claim 18, wherein at least one of the one or more objects is a building.

20. The system of claim 19, wherein a delta for the building reflects changes in building elevation resulting from demolition or construction.

\* \* \* \* \*